US009165235B2

(12) United States Patent
Biro et al.

(10) Patent No.: US 9,165,235 B2
(45) Date of Patent: Oct. 20, 2015

(54) METHOD AND APPARATUS FOR PROTECTING INFORMATION IN MAGNETIC STRIP AND RFID CARDS FROM FRAUDULENT SCANNING

(71) Applicant: Garble, LLC, Indialantic, FL (US)

(72) Inventors: Andy Biro, Melbourne, FL (US); Kevin J Bartczak, Indialantic, FL (US)

( * ) Notice: Subject to any disclaimer, the term of this patent is extended or adjusted under 35 U.S.C. 154(b) by 0 days.

(21) Appl. No.: 14/281,474

(22) Filed: May 19, 2014

(65) Prior Publication Data

US 2014/0374488 A1    Dec. 25, 2014

Related U.S. Application Data

(60) Provisional application No. 61/825,673, filed on May 21, 2013.

(51) Int. Cl.
G06K 19/06    (2006.01)
G06K 19/073    (2006.01)
G06K 19/07    (2006.01)

(52) U.S. Cl.
CPC ...... G06K 19/07327 (2013.01); G06K 19/0723 (2013.01)

(58) Field of Classification Search
CPC .............. H01L 2924/00; H01L 2224/48091; H01L 2924/00014; H01L 2924/0002; H01L 2224/48465; H01L 2924/3025; H01L 2224/48227; G06K 19/07749; G06K 19/07327; G06K 19/07771; H01Q 1/2225; H01Q 1/526
USPC ....................................................... 235/492
See application file for complete search history.

(56) References Cited

U.S. PATENT DOCUMENTS

| 6,121,544 | A | 9/2000 | Petsinger | |
|---|---|---|---|---|
| 7,421,245 | B2 | 9/2008 | Lieffort | |
| 7,719,425 | B2 | 5/2010 | Colby | |
| 8,313,037 | B1 | 11/2012 | Humphrey | |
| 8,376,239 | B1 | 2/2013 | Humphrey | |
| 8,427,317 | B2 | 4/2013 | Hammad | |
| 2006/0132313 | A1* | 6/2006 | Moskowitz | 340/572.7 |
| 2007/0090954 | A1* | 4/2007 | Mahaffey | 340/572.3 |
| 2007/0127129 | A1* | 6/2007 | Wood et al. | 359/619 |
| 2008/0059379 | A1 | 3/2008 | Ramaci et al. | |
| 2009/0315320 | A1* | 12/2009 | Finn | 283/107 |
| 2010/0265037 | A1 | 10/2010 | Domsten et al. | |
| 2013/0307687 | A1 | 11/2013 | Kay | |

FOREIGN PATENT DOCUMENTS

| GB | 2453859 | 4/2009 |
|---|---|---|
| WO | WO2011124911 | 10/2011 |

* cited by examiner

*Primary Examiner* — Thien M Le
*Assistant Examiner* — Tae Kim
(74) *Attorney, Agent, or Firm* — John L. DeAngelis; Beusse Wolter Sanks & Maire, PLLC

(57) ABSTRACT

A device for preventing unwanted electromagnetic inquiry of an electronic card storing information thereon by the transmission of a rogue interrogating signal from an RFID skimmer proximate the electronic card. The device comprises a first and a second conductive material layer each operating to detune an antenna associated with the electronic card or to detune front end resonant circuits associated with the electronic card, and one or more third material layers having a greater thickness than the first and second layers and disposed between the first and second layers, the one or more third material layers providing electromagnetic shielding against radio frequency signals emitted from the electronic card.

4 Claims, 4 Drawing Sheets

METHOD AND APPARATUS FOR PROTECTING INFORMATION IN MAGNETIC STRIP AND RFID CARDS FROM FRAUDULENT SCANNING

CROSS REFERENCE TO RELATED APPLICATIONS

This patent application claims the benefit of the provisional patent application No. 61/825,673 filed on May 21, 2013, entitled Method and Apparatus for Protecting Information in Magnetic Strip Cards and RFID Cards from Fraudulent Scanning.

FIELD OF THE INVENTION

This invention relates to methods and devices for protecting information in magnetic strip cards and RFID cards from fraudulent detection by unauthorized scanning. Specifically, the inventive device protects against fraudulent reading of RFID cards at a distance, and against the fraudulent reading of magnetic strip cards, when the magnetic strip card and the inventive device are proximate and the fraudulent scanning is attempted at a close range.

BACKGROUND OF THE INVENTION

RFID device use is proliferating worldwide with a growing concern regarding security of the sensitive information stored within these devices and safeguarding that information against unwanted or unauthorized retrieval. These issues are becoming a significant problem worldwide.

RFID cards, RFID devices, RFID enabled credit cards, financial cards, ATM cards, debit cards, stored-value cards, banking cards, passports, and other convenience cards (herein referred to generically as RFID devices or electronic cards) may be "read" at a distance by individuals or remotely operated systems seeking to gain the stored secret or proprietary information, such as bank account numbers, identification information (social security numbers, address, phone numbers, building access information, student personal data, TSA clearance information, or medical information.

Best practices dictate using a method and/or device for guarding such information by disabling the functionality of RFID device except when they are to be legitimately used by the owner or an authorized entity. Although sophisticated methods may be employed to prevent unauthorized use or access, for instance through use of active and interfering signals broadcast in proximity to the subject RFID device, these are more costly and are generally classified as "jammers," as is known in the art. Therefore a simple but effective method and/or device is desired to prevent unauthorized reading or inquiry of RFID devices, and in particular wallet-sized cards carrying magnetic strip and RFID cards or devices.

One such well-known method and/or device shields the RFID device from unwanted interrogating RF signals transmitted from an RFID skimmer that are intended to activate circuits within the RFID device and cause it to transmit or emit sensitive information stored on the device back to the RFID skimmer. Such shielding may be so complete as to form a Faraday shield or cage around the RFID device, and in fact metallic wallets, sleeves, and envelopes have been developed for this purpose. These prior art devices require user intervention to remove the card from the wallet or sleeve to use the card. This may be inconvenient for the user.

BRIEF DESCRIPTION OF THE DRAWINGS

The present invention can be more easily understood and the further advantages and uses thereof more readily apparent, when considered in view of the following detailed description when read in conjunction with the following figures, wherein.

In accordance with common practice, the various described features are not drawn to scale, but are drawn to emphasize specific features relevant to the invention. Reference characters denote like elements throughout the figures and text.

DETAILED DESCRIPTION OF THE INVENTION

Figure 1:
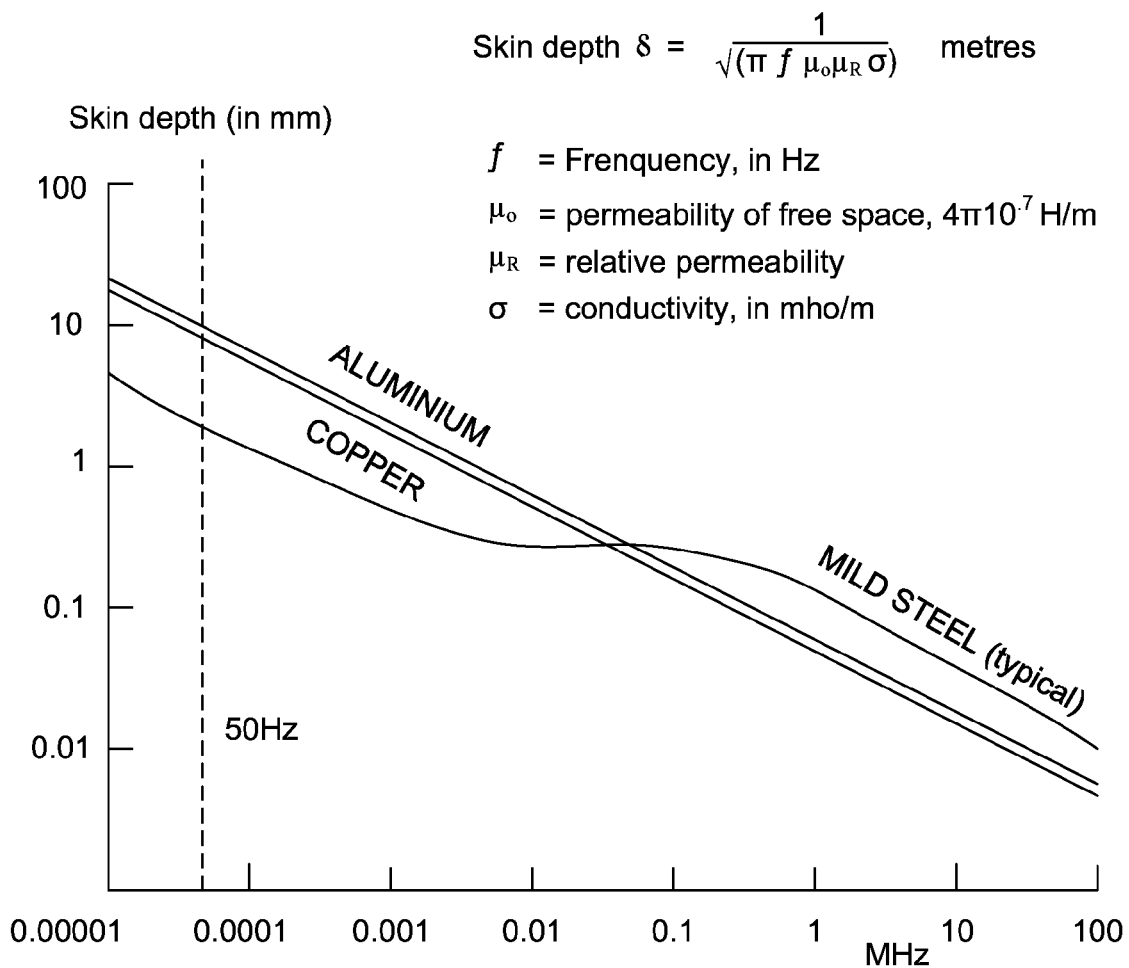
FIG. 1 is a graph showing the skin depth as a function of frequency for three different metals.

Before describing in detail the particular methods and apparatuses related to a shield for RFID and magnetic stripe devices and cards, it should be observed that the present invention resides primarily in a novel and non-obvious combination of elements and process steps. So as not to obscure the disclosure with details that will be readily apparent to those skilled in the art, certain conventional elements and steps have been presented with lesser detail, while the drawings and the specification describe in greater detail other elements and steps pertinent to understanding the inventions.

The presented embodiments are not intended to define limits as to the structures, elements or methods of the inventions, but only to provide exemplary constructions. The embodiments are permissive rather than mandatory and illustrative rather than exhaustive.

The device of the present invention in one embodiment is in the form of a card that can be carried with other conventional cards, for example in a clip, wallet, purse, stack, or a partially overlapping stack.

The inventors have years of experience implementing security solutions in commercial and government business operations and have tested several ideas to protect RFID cards that are carried in a wallet or purse. This effort required in-depth experimentation, testing and consulting with security and RFID card specialists to create a protective device that is affordable and effective. The various embodiments of such a protective device, referred to commercially as a GarbleCard™ shield or protective cover, are presented herein.

In lieu of forming a Faraday cage around the RFID device or card in some applications it may be more convenient to provide a partial shield that covers the majority of the RFID device area or volume. In the case of RFID cards, a partial shielding function can be provided by folding metallic fabric or foil such that it wraps around one or more cards. Alternatively, some shielding can be provided using two planar metallic foils, sheets, or meshes one on each side of the RFID device or card. Although such shielding may not completely enclose the RFID card, it may sufficiently attenuate the unauthorized broadcast-reading signal such that the RFID device does not respond with stored information or may respond with incomplete or garbled information. As described below, this shield may detune an antenna associated with the RFID card or change the resonant frequency of front end resonant circuits of the RFID card. The shield may also detune the rogue interrogating signal transmitted by the RFID skimmer or change the resonant frequency of front end resonant circuits of the RFID skimmer.

The effectiveness of a shielding device may be computed or measured by various means depending on the shield configuration relative to the RFID device. If the shield is placed closer than about 0.7 wavelengths from the RFID device, the shield is considered within the "near field" of any radio frequency wave broadcast from the device.

The shielding effectiveness is generally computed as the sum of the electric and magnetic field reflection plus absorption characteristics. For a shield to be effective, it must block electric and magnetic fields in any combination in which they may occur. A perfectly electrically conducting enclosure encapsulating a device prevents any electric field outside the enclosure from exerting influence on electric charges within the device. Such an enclosure is called a Faraday cage as proposed by Michael Faraday in the 1830s and has a 100% shielding effectiveness to static electric fields.

Magnetic fields are created by moving charges; i.e., by electric currents. Currents flowing externally to an enclosure produce magnetic lines of force that follow a path of least resistance i.e., highest permeability. Shielding against magnetic fields can be achieved in two ways: by surrounding the protected volume with an enclosure comprised of materials of (1) high magnetic permeability or (2) materials of high electrical conductivity, low permeability, and of sufficient thickness. In the latter case, an alternating external magnetic field creates circular currents in the conductive material, which produces a magnetic field that opposes the external magnetic field. The thickness of the material and the alternating current frequency determine the degree of shielding achievable.

The so-called skin depth, the depth at which the induced current is reduced to 1/e of its surface value, is given by:

$$1/(\pi \times f \times \mu \times \sigma)^{1/2}$$

where f is the frequency of the magnetic excitation, μ is the magnetic permeability, σ is the electrical conductivity and π is a known constant. From this equation, it can be seen that a high conductivity and high permeability result in the smallest skin depth and therefore the best current confinement to the outer layers of the shield. Confining the current to this skin depth produces a better shield against magnetic fields and the magnetic component of a time-varying electromagnetic field.

Note also that lower frequencies produce less confinement of the current and therefore are more difficult to shield. It should also be noted that low frequency RFID signals are used in the low frequency spectrum near about 125 KHz, where it is more difficult to achieve shielding with thin conductive materials. The physical construction of the present invention provides a greater thickness while still maintaining the mechanical and manufacturability properties dictated by the credit card industry.

Generally, it is desired to confine a fraudulent scanning signal (also referred to as an unwanted electromagnetic inquiry) to an outer region of the shield of the present invention. And conversely it is desired not to create a shield that is excessively thin that permits significant current flow on the inside surface of the shield, thereby allowing coupling of the magnetic signal to the adjacent or enclosed RFID device.

The following rules of thumb are well known in the art:
8.7 dB of magnetic shielding results at one skin depth
10 skin depths develop nearly 87 db of magnetic shielding A graph showing the skin depth as a function of frequency for three different metals is shown in FIG. 1. As can be seen, above 0.1 MHz, copper offers a smaller skin depth when compared with aluminum and mild steel. Using the rule of thumb for magnetic field shielding, more than 10 depths may be necessary for 90 dB of shielding. At a frequency of 13.45 MHz where many RFID cards operate, this translates to a thickness of nearly 8 thousandths of an inch with copper as a preferred material. The skin depth for copper (Cu) at 13.45 MHz is about 18 micrometers, so that nearly 200 micrometers of copper are required to achieve a 90 dB shield effectiveness. These computations apply to Faraday cages or shields where the protected object is completely surrounded or blocked with shielding material.

The present invention uses a shielding approach comprising a substantially planar sandwich of multiple materials that together play at least two different roles in protecting an RFID device from unauthorized access by an attacker using an RFID skimmer.

Firstly, the shielding approach utilized provides a partial Faraday cage (a planar shield) and secondly, the shield is constructed to detune the circuitry associated with the front-end RF circuits and antenna within the RFID device or card.

The protective card or protective device of the present invention is constructed with a thin conductive outer layer that ensures maximum capacitive loading effect to adjacent circuits present in the RFID card. This layer also provides a limited degree of shielding effectiveness according to the material conductivity, permeability, and thickness.

A central inner layer (or layers) of substantially greater thickness than the outer layers provides much greater shielding effectiveness. Construction in this manner with individual layers preserves the flexibility of the card, provides a minimum spacing to the adjacent tuned circuits associated with the RFID card front end, and provides maximum shielding effectiveness using a thicker central layer(s).

The detuning feature comprises a thin conductive material that capacitively loads the tuned RF circuit, and thus detunes it, within the RFID card. This tuned circuit must receive an excitation signal from the fraudulent or attacker's scanning RFID skimmer to activate the card and then read the data stored on the card. Capacitively loading the tuned circuit changes its oscillation or resonant frequency to the extent that the RFID skimmer cannot excite the tuned circuit to activate the RFID card. The proximity of this highly conductive material of the protective device of the present invention also detunes the antenna, thereby increasing its return loss, which effectively decouples the antenna from the front end circuits. This decoupling loss also reduces the ability of the circuits to respond to an externally applied interrogation signal, the rogue interrogating signal.

Construction of the inventive protective device or card is not readily obvious as the inventors have found substantial differences in performance based on choice of materials and their location in the sandwich structure. In a preferred embodiment, the protective device comprises a substantially planar card with conductive materials placed as close as feasible to the external surfaces of the sandwich. This placement allows the greatest degree of capacitive loading to an adjacent RFID card and therefore a reduction in the magnitude of the fraudulent scanning signal that reaches the RFID card.

Additionally, the reply signal broadcast from the RFID card will similarly be attenuated. As such, the protective card need not necessarily be placed between the reader and the RFID card to be protected, as is the case with an ordinary prior art shield. Two conductive outer layers (referred to as front and back layers for convenience although these two layers may be identical and therefore allow the user to place the RFID card against either one of the front and back layers) are used in a preferred embodiment as the protective card of the invention may be placed in one of two possible positions against the RFID card.

These conductive outer layers may be relatively thin and placed very close to or at a surface of the protective card (i.e., the GarbleCard™) or at least as close as practical given the employed mass production and printing processes.

The protective card or device also comprises one or more layers that act as a combined electric and magnetic field shield, with a shielding effectiveness in excess of that achievable with a thin conductive layer, that is, in excess of the electric field shield value alone. For example, at 13.5 MHz, in one embodiment the protective device provides an electric field attenuation of about 172 dB combined with magnetic field attenuation in excess of about 108 dB. In another embodiment the magnetic field attenuation can be as high as 122 dB. Single-layer thin (1 mil) conductors however provide theoretical electric field attenuation due to reflection of 172 dB but less than 1 dB of absorption loss due to magnetic field.

Although reflection alone can provide reasonable protection, it is also desirable to have an effective absorption. Experiments have shown that a single layer of conductive material of 1 mil thickness is not sufficient to provide adequate protection from high power or longer range reading devices. A reasonable shielding effectiveness from comprehensive testing indicates that shielding effectiveness should consist of both reflection and absorption components each in excess of about 100 dB.

Figure 2:
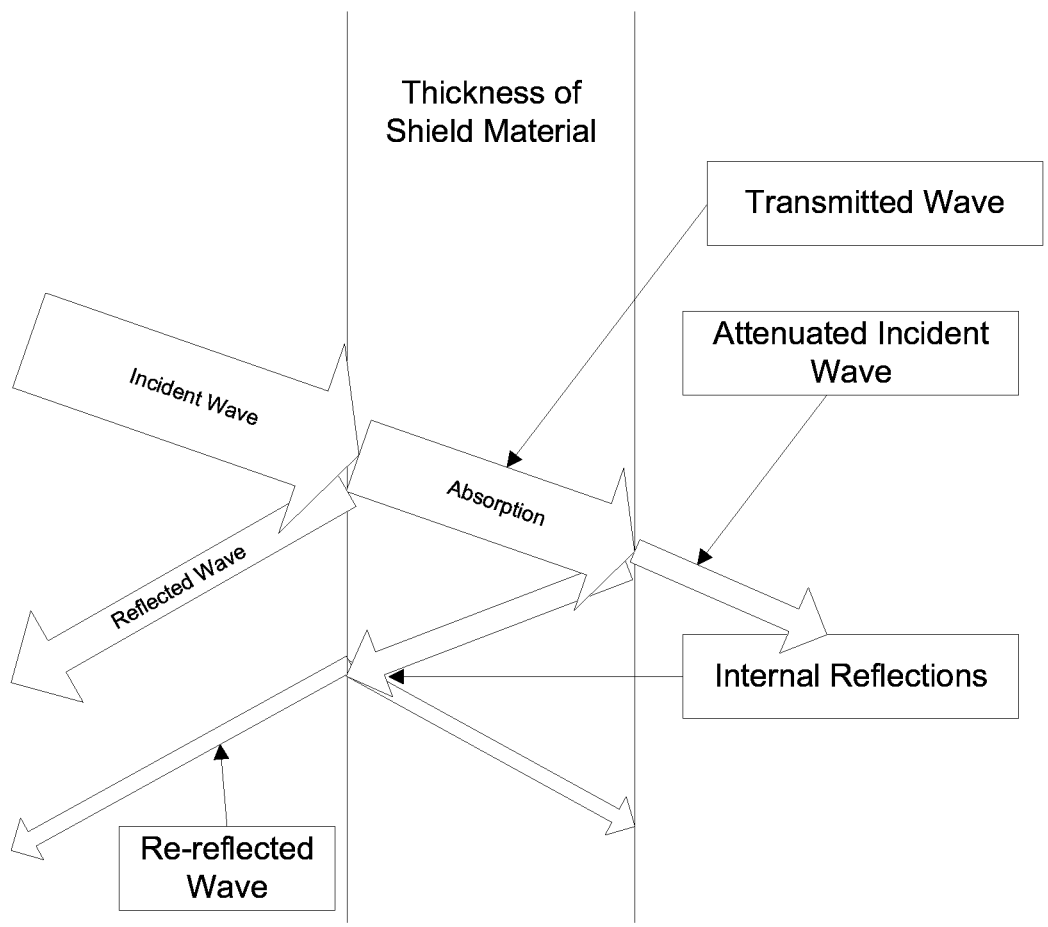
FIG. 2 is a graph illustrating losses due to reflection and absorption processes.

In a typical shielding application, each layer contributes to the shielding effect, which is due to losses from reflection, and absorption processes. See the diagrammatic illustration of FIG. 2, where a thickness of an arrowhead indicates a relative magnitude.

The inventors have computed several comparisons for reflective and absorptive losses in the tables set forth below based on near-field electromagnetic computations. The equations from which these tables are derived are known in the art.

Figure 3:
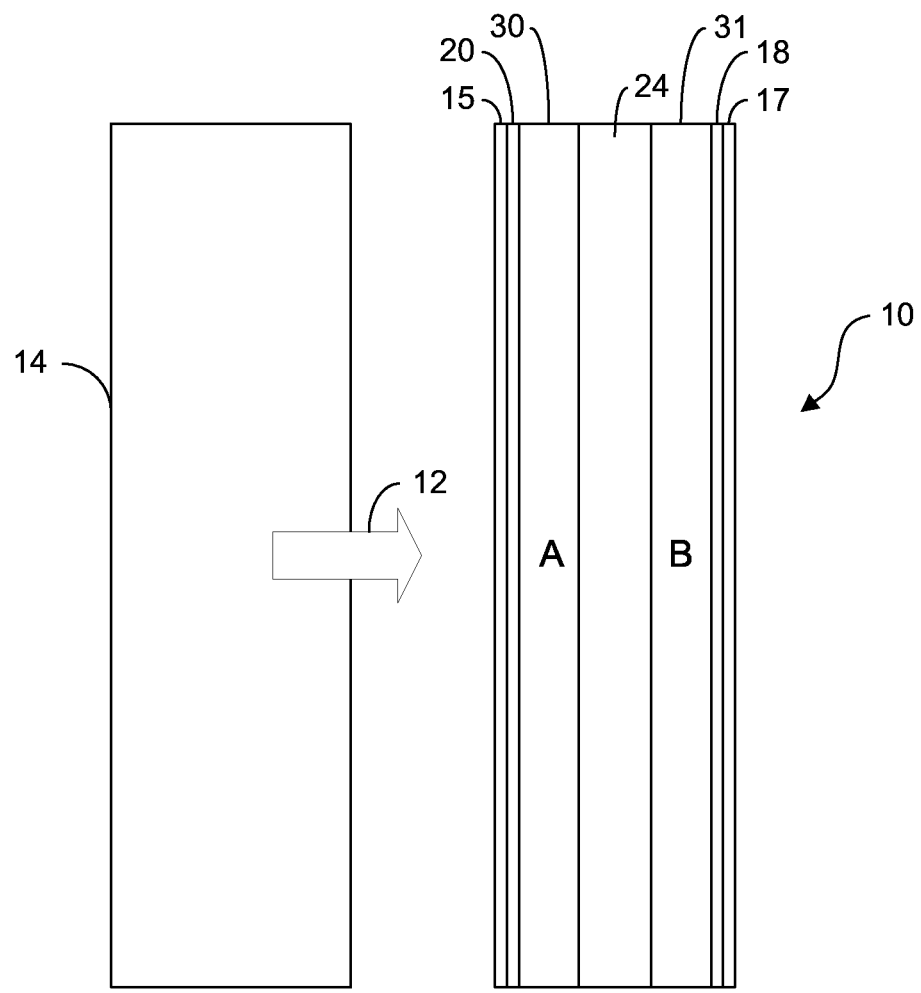
FIG. 3 is an illustration of an embodiment of the protective device of the present invention providing both a detuning mechanism and a reflective/absorptive shield for protecting an RFID card.

One embodiment of a multi layer protective device (commercially known as a GarbleCard™ protective device or card) 10 is shown in FIG. 3. The protective device 10 is placed proximate an RFID card 14 to be protected. An RF wave 12 emanates from the RFID card 14 as in this example it is assumed, solely for explanatory purposes that a fraudulent hacker or attacker has activated the RFID card 14 (notwithstanding the existence of the protective device 10) and caused generation of the RF wave 12.

Two outer layers 15 and 17 comprise any material on which logos, text, etc. can be printed. The composition of these layers is not germane to the teachings of the present invention.

Conductive layers 18 and 20 are disposed on opposite sides of a mid-layer 24. A thickness of each conductive layer 18 and 20 is designated "t". The mid-layer 24 is shown with substantially greater thickness compared to the conductive layers 18 and 20.

Layers 30 and 31 complete the sandwich structure. Typically a material of the layers 30 and 31 comprises a dielectric and/or an adhesive.

In one embodiment the layers 18 and 20 range in thickness from about less than about 0.2 mils to greater than about 1.5 mils. The mid-layer 24 is about 10 thousands of an inch thick. A distance between a centerline of the RFID card 14 to the layer 20 is about 35 mils. All dimensions illustrated in this non-limiting example are merely exemplary and are given in thousandths of an inch or mils.

Shielding effectiveness is the sum of the reflected loss and the absorption loss since both phenomena are effective to prevent reading the RFID card 14 from a location at a distance from the card, such as a distance of about 35 mils.

The distance to the hacking skimmer may be very close or at a significant distance as determined by its broadcast power and received signal sensitivity. The inventors have found that the protective device 10 functions for skimmers located at a distance of many meters and for skimmers in contact with the RFID card, the latter being more challenging for protective devices of poor or lower shielding effectiveness. A skimmer may be able to overcome the effectiveness of the protective device 10 of the present invention if within several inches of the victim card.

In certain applications the protective card 10 of the present invention is effective due to a combination of shielding effectiveness and a detuning effect. The shielding effectiveness depends on the combined reflection and absorption properties of the combined sandwich consisting of multiple layers as illustrated in FIG. 3. The detuning effect is a result of the distance between the RFID skimmer and the RFID card 14 and the extent of overlap between the protective device 10 and the RFID card 14. As seen in the tables below, the layers 18 and 20 contribute little to the magnetic shielding effectiveness, but are effective reflectors of an incident wave, and also function as detuning elements for the RFID antenna and its associated tuning circuits in the RFID card 14.

The computed results are set forth in Tables 1 and 2 below. Both the electric and the magnetic shielding effectiveness are measured in decibels (dB) and are given in successive columns of the Tables corresponding to the thickness "t" of the layers 18 and 20 comprising copper material. Note that Tables 1 and 2 are not intended to show experimental results for the layer 18, but only the effects of the two layers 20 and 24.

At a location "A" (see FIG. 3) and a thickness of 0.2 mils for the layer 20, a magnetic field reflection of 24 dB and an electric field reflection of 172 dB are achieved. See Table 1 and FIG. 3. Note that the RF wave 12 first strikes the layer 20.

The corresponding absorption for either magnetic or electric fields by the layer 20 (again, at the location "A" in FIG. 3) is only 2 dB. This material thickness of 0.2 mils results in a shield effectiveness of 26 dB for magnetic fields and 174 dB for electric fields.

At the location "B" (i.e., after the RF wave 12 has passed through the mid-layer 24 of 10 mils thickness) there is no change in the reflection numbers in Table 1, but the absorption losses are at 106 dB for both the electric and magnetic fields.

The last two columns of Table 1 indicate the total thickness of the operative layers to the point "B", the total reflection losses, the total absorption losses, and the overall shield effectiveness for the electric (E) and magnetic (M) fields. The latter parameter derived from a sum of the reflection and absorption losses for each of the electric and magnetic fields.

By changing the thickness of the layer 20 to 1.5 mils as in Table 2, the reflective losses for both the electric and magnetic fields as reflected at locations "A" and "B" are the same as the results reported in Table 1. These results suggest that the material thickness does not affect the reflection properties.

But the absorption losses for the magnetic and electric fields at location "A" increase to a much higher value of 16 dB.

The net result is an absorption of 122 dB for both the magnetic and electric fields. Also, Table 2 reports a better overall shield effectiveness (than reported in Table 1) as set forth in the last line of the last two columns of Table 2.

The net reflection is not increased substantially by changing the thickness from 0.2 mils (Table 1) to 1.5 mils (Table 2) as the first layer reflects a significant fraction of the impinging wave. But the material thickness is necessary for absorbing near field signals, and this is borne out by measurements of shielding effectiveness for electromagnetic waves from actual RFID cards and associated reading devices.

TABLE 1

Reflection, Absorption, and Shield Effectiveness for magnetic and electric fields (near field regime) at locations "A" and "B" versus layer thickness for a first embodiment

| Field type<br>Location | M<br>"A" | E<br>"A" | M<br>"B" | E<br>"B" | M<br>Tot | E<br>Tot |
|---|---|---|---|---|---|---|
| "t" (mils) | 0.2 | 0.2 | 10 | 10 | 10.2 | 10.2 |
| Reflection (dB) | 24 | 172 | 26 | 172 | ~24 | −172 |
| Absorption (dB) | 2 | 2 | 106 | 106 | 108 | 108 |
| Shield Effectiveness | 26 | 174 | 132 | 278 | 132 | 280 |

TABLE 2

Reflection, Absorption, and Shield Effectiveness for magnetic and electric fields (near field regime) at locations "A" and "B" versus layer thickness for a second embodiment

| Field type<br>Location | M<br>"A" | E<br>"A" | M<br>"B" | E<br>"B" | M<br>Tot | E<br>Tot |
|---|---|---|---|---|---|---|
| "t" (mils) | 1.5 | 1.5 | 10 | 10 | 11.5 | 11.5 |
| Reflection (dB) | 24 | 172 | 26 | 172 | ~24 | −172 |
| Absorption (dB) | 16 | 16 | 106 | 106 | 122 | 122 |
| Shield Effectiveness | 40 | 188 | 132 | 278 | 146 | 294 |

The comparisons shown in Tables 1 and 2 illustrate the need for a thicker material (e.g., the mid-layer 24 in FIG. 3) to increase the absorption losses, while the reflective loss for the electric field is relatively constant for the layers 18 and 20 over nearly a factor of 10 (0.2 TO 1.5 mils) in thickness.

The mid-layer 24 is sufficiently thick at 13.5 MHz to provide a high absorption loss for the magnetic field and virtually the same electric field reflection loss compared to the thinner material of layers 18 and 20.

It is therefore advantageous to use multiple thin layers (at least one such layer on each side of the mid-layer 24) spaced apart from the center line of the protective card to achieve capacitive loading for detuning, while using a relatively thicker inner layer (such as the mid-layer 24, or in another embodiment multiple layers) to provide a much higher absorptive loss for electric/magnetic fields and therefore higher overall shield effectiveness.

As already indicated, the outer layers 18 and 20 serve a dual function while the mid-layer (s) 24 provide high absorptive and reflective losses for magnetic and electric (near) fields respectively.

Figure 4:
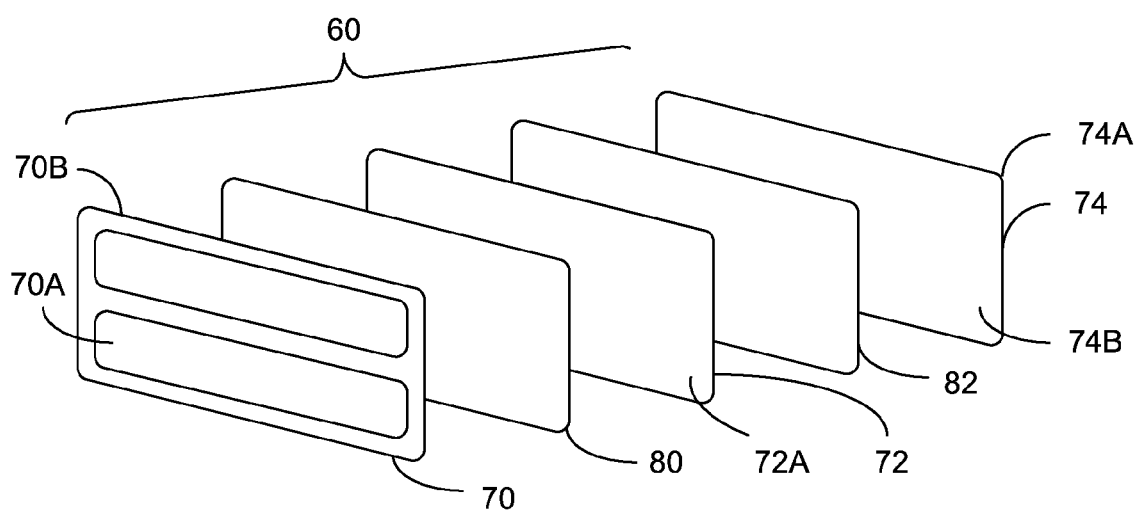
FIG. 4 is an illustration of another embodiment of the protective device of the present invention.

FIG. 4 is an exploded view of another embodiment of a protective device 60 of the present invention. This embodiment comprises three layers 70, 72 and 74, and epoxy layers 80 and 82 to bind the three layers together. The dimensions supplied are merely illustrative.

Layer 70:
20 mm PVC plastic card (85.60×53.98 mm (3.370×2.125 in)
An outwardly-facing surface 50A is printed with the GarbleCard™ logo.
Serves as the front of the GarbleCard™ card.
An inwardly-facing surface 50B is smooth and bears no printing.
The outwardly-facing surface 50A may comprise a clear protective laminate.

Layer 80
An epoxy or adhesive layer.
Layer 72:
Shielding material as applied to a surface 72A using the epoxy resin material layer 80 to serve as a glue or adhesive.
Comprises #100 copper 0.0045" wire mesh extending across and covering the surface 72A to about ¹⁄₁₆" of all four card edges. This ¹⁄₁₆" region allows sealing of the layer 72 and the layer 70.
Layer 82
An epoxy or adhesive layer.
Layer 74
20 mm PVC plastic card (85.60×53.98 mm (3.370×2.125 in)
An outwardly facing surface 74A carries a QR barcode that links the user to "best use" instructions and GarbleCard™ background information and contact information when scanned.
Simple use instructions may also be printed on the surface 74A.
The inwardly-facing surface 74B is smooth and unprinted and accepts the copper emulsified adhesive of the layer 82.
The layer 74 comprises a clear protective laminate.

In another embodiment, the outwardly facing surface of either layers 70 or 74 (or both layers 70 and 74) carries a ½" iron oxide stripe from side to side (3.370×0.5 in) to provide additional protection against magnetic stripe scanning. This stripe is centered equidistant from the top and bottom of the card 60 so as not to contact a credit card magnetic stripe.

The protective device of the present invention may also include a radio frequency shielding and Faraday construction that can also be accomplished with any one of three popular copper meshes as well as solid or composite materials.

1) #16 mesh 0.011" wire diameter offers the lowest shielding effectiveness.
2) #22 mesh 0.015" wire diameter is specified by the U S government Tempest program. This material is a sturdy mesh and offers better shielding characteristics than the #16 mesh.
3) #100 mesh 0.0045" wire diameter is the finest practical copper shielding mesh and very effective into the higher frequencies.

One embodiment comprises material 2) from the above list. Another embodiment uses a thin sheet of commercial aluminum foil (0.0016 mil) as the shield. The results with this latter material appear not as effective as with thicker and higher conductivity materials.

Another embodiment uses magnetic materials as one or more layers with magnetic permeability greater than 1.

Additional embodiments may utilize special conductive patterns that reflect or absorb energy based on their pattern design and fall into the class of engineered materials, frequency selective surfaces, etc.

Emulsified materials containing shielding material may also be used in construction of the protective device of the present invention.

A preferred embodiment compatible with large scale manufacturing methodology consists of a card 3.37×2.125 inches and 30 to 35 thousands of an inch in thickness. The card is constructed of a core with 0.008-inch deep cavity 3.14×1.86 inches in cross-section. A slug is inserted into this cavity; the slug comprises five layers with a total thickness 0.0073 inches. The slug layers comprises the following:

0.0014 inch cooper foil, 0.002 inch adhesive, 0.0005-inch #100 cooper mesh, 0.002 inch adhesive, and 0.0014 inch cooper foil.

The slug having three shielding layers during manufacture is inserted into the core cavity, which is then filled with liquid PVC material and formed into a solid structure. The solid completed core is then sandwiched between two PVC laminates as follows: laminate over-printing, print coating, 0.007-inch PVC stock, adhesive, core insert, adhesive, 0.007 inch PVC stock. Print coating, laminate over-printing. The completed card is 0.030 to 0.035-inch thick and meets all FIPS 201 certification requirements.

Should an attacker attempt to read a magnetic stripe card, this added protection will be read instead of the victim's card as it is a larger magnetic surface with a high magnetic density.

Although the present invention has been described with respect to RFID cards, magnetic strip cards can also benefit from the present invention due to the shielding and detuning effects provided.

One embodiment further comprises an iron oxide ½ inch magnetic stripe to provide an extra measure of credit card security. There is little evidence that card hackers are stealing credit card information by scanning the magnetic stripes, but with this added stripe on the protective device of the present invention the attacking scanner will pick up the stronger signal, which will be GARBLECARD.COM written on all 12 lines of the card's magnetic stripe Based on testing and research by the inventors, using the protective device properly applied makes it more difficult for an attacker to scan an RFID card and a magnetic stripe card. Like the home security system, the protective device makes the hacking process more difficult and moves the majority of would-be attackers on to victim employing protection techniques that are less effective than the protective device of the present invention.

What is claimed is:

1. A device for preventing unwanted electromagnetic inquiry of an electronic card storing information thereon by the transmission of a rogue interrogating signal from an RFID skimmer proximate the electronic card, the device comprising:
    a card defining a cavity formed therein;
    a slug disposed with the cavity, the slug comprising:
        a first copper foil layer;
        a first adhesive layer;
        a copper mesh layer copper;
        a second adhesive layer; and
        a second copper foil layer.

2. The device of claim 1 wherein the electronic card comprises an RFID card, and an RFID device, a financial card, or a radio frequency communications device.

3. The device of claim 1 wherein the device is disposed within the near field of radio frequency signals emitted from the electronic card.

4. The device of claim 1 wherein the first and second copper foil layers provide electromagnetic shielding and absorption properties responsive to the conductivity, permeability and thickness thereof.

* * * * *